US 7,079,581 B2

(12) United States Patent
Noh et al.

(10) Patent No.: US 7,079,581 B2
(45) Date of Patent: Jul. 18, 2006

(54) APPARATUS AND METHOD FOR CONTROLLING VARIABLE BIT RATE IN REAL TIME

(75) Inventors: Kyung-heon Noh, Suwon (KR); Byeung-woo Jeon, Seongnam (KR); Seh-woong Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 699 days.

(21) Appl. No.: 10/210,322

(22) Filed: Aug. 1, 2002

(65) Prior Publication Data

US 2003/0202580 A1 Oct. 30, 2003

(30) Foreign Application Priority Data

Apr. 18, 2002 (KR) ................................ 2002-21310

(51) Int. Cl.
*H04N 7/12* (2006.01)

(52) U.S. Cl. ................................ 375/240.16
(58) Field of Classification Search ...............................
375/240.12–240.17, 240.02–240.07; 348/699–700, 348/416.1; 382/236, 238–239; 386/109, 386/111
See application file for complete search history.

(56) References Cited

U.S. PATENT DOCUMENTS

| 5,231,484 | A  | * | 7/1993  | Gonzales et al. ...... 375/240.04 |
| 5,694,171 | A  | * | 12/1997 | Katto .................... 375/240.03 |
| 6,434,196 | B1 | * | 8/2002  | Sethuraman et al. ... 375/240.12 |
| 6,510,176 | B1 | * | 1/2003  | Fukuda et al. ......... 375/240.02 |
| 2001/0000704 | A1 |   | 5/2001  | Fert et al. .................... 375/240 |

OTHER PUBLICATIONS

Teixeira et al, "Analysis of a two step MPEG video system", International Conference on Image Processing, vol. 1, pp. 350-352, Oct. 1997.*
Chow et al, "Complexity based rate control for MPEG encoder", IEEE International Conference Image Processing, vol. 1, pp. 263-267, Nov. 1994.*

* cited by examiner

*Primary Examiner*—Vu Le
(74) *Attorney, Agent, or Firm*—F. Chau & Association, LLC

(57) ABSTRACT

An apparatus and method for controlling a variable bit rate in real time are provided, including an encoding unit for performing a predetermined image conversion on present video data to be encoded and for encoding the video data into a variable bit rate by quantizing the conversion result, and a variable bit rate controller for allocating an overall bit estimate of the video data to be stored in a system to each frame according to a variation in video recording time, for detecting the complexity of frames based on a difference between pixels of the encoded video data and for determining a quantization factor using the detected complexity.

53 Claims, 9 Drawing Sheets

APPARATUS AND METHOD FOR CONTROLLING VARIABLE BIT RATE IN REAL TIME

BACKGROUND OF THE INVENTION

1. Field of the Invention

The present invention relates to the compression of a digital video signal, and more particularly, to an apparatus and method for controlling a variable bit rate ("VBR") in a video recording system, such as, for example, a digital camera or a digital camcorder, in real time.

2. Description of the Related Art

An output bit stream meeting a digital video compression standard, such as, for example, MPEG-2, MPEG-4 or H.263, may be used with a constant bit rate ("CBR") or a variable bit rate ("VBR"), according to the purpose.

A CBR encoding has been extensively used because it is a simple process, but it is disadvantageous in that the quality of an image is lowered in an actual video sequence having a severe fluctuation between frames. On the other hand, VBR encoding enables variable and effective allocation of bits in a limited storage space, thereby regularly maintaining the quality of an image and enabling the effective compression of the encoding.

In general, a two-step quantization is required in a method of controlling the VBR: an optimum quantized parameter is detected and selected in the first step; and quantization is actually performed using the selected quantized parameter in the second step. The method of controlling the VBR is useful in detecting the optimum quantized parameter, but a delay in the encoding may be caused during which the two-step quantization is performed. Therefore, this method is not appropriate for application to a system of compressing and storing video data in real time.

SUMMARY OF THE INVENTION

To solve the above-described problem, embodiments of the present invention provide an apparatus and method for controlling a variable bit rate ("VBR") in real time, where the apparatus is easy to fabricate and can store encoded video data in real time without deteriorating the quality of an image.

Accordingly, to achieve an aspect of the above embodiments, there is provided an encoder including: an encoding unit for performing a predetermined image conversion on present video data to be encoded and encoding the video data into a variable bit rate by quantizing the conversion result; and a variable bit rate controller for allocating overall bit estimate of the video data, which is to be stored in a system, to each frame according to a variation in video recording time, detecting the complexity of frames based on a difference between pixels of the encoded video data, and determining a quantization factor using the detected complexity.

To achieve another aspect of the above embodiments, there is provided an encoder including: an encoding unit for performing predetermined conversion on the present video data to be encoded and encoding the video data into a variable bit rate by quantizing the conversion result; a complexity calculator for allocating overall bit estimate of the video data to each frame according to a variation in video recording time and detecting the complexity of the frame with a difference between pixels of the previous video data and the present video data; a target bit rate decision unit for determining a target bit rate to be stored in each frame in accordance with the detected complexity; a scene change detector for detecting a scene change in the present video data in accordance with the detected complexity; a group-of-pictures ("GOP") selector for grouping frames of the present video data into GOP having frames of similar complexity; a rate distortion function updating unit for updating a rate distortion function, which is to be used in calculating a quantization factor, according to the grouping result; and a quantization factor decision unit for calculating the quantization factor with the complexity, the bit estimate, the target bit rate, and parameters updated by the rate distortion function updating unit.

To achieve still another aspect of the above embodiments, there is provided an encoding method including: (a) encoding a video object with an initial quantization factor; (b) grouping frames into GOP having frames of similar complexity, using the quantization factor; (c) updating parameters of a rate distortion function in accordance with the GOP; (d) determining if a scene change is detected; (e) converting the picture type from P type to I type and grouping frames into GOP, returning to step (b), when it is determined in step (d) that a scene change is detected; (f) allocating overall bit estimate to each frame and determining a target bit rate of a frame when it is determined in step (d) that a scene change is not detected; (g) calculating a new quantization factor and a variation in the quantization factor with the complexity and the target bit rate; and (h) encoding the video object with the quantization factor calculated in step (g).

BRIEF DESCRIPTION OF THE DRAWINGS

The above objects and advantages of the present invention will become more apparent by describing in detail a preferred embodiment thereof with reference to the attached drawings, in which.

DETAILED DESCRIPTION OF THE INVENTION

Figure 1:
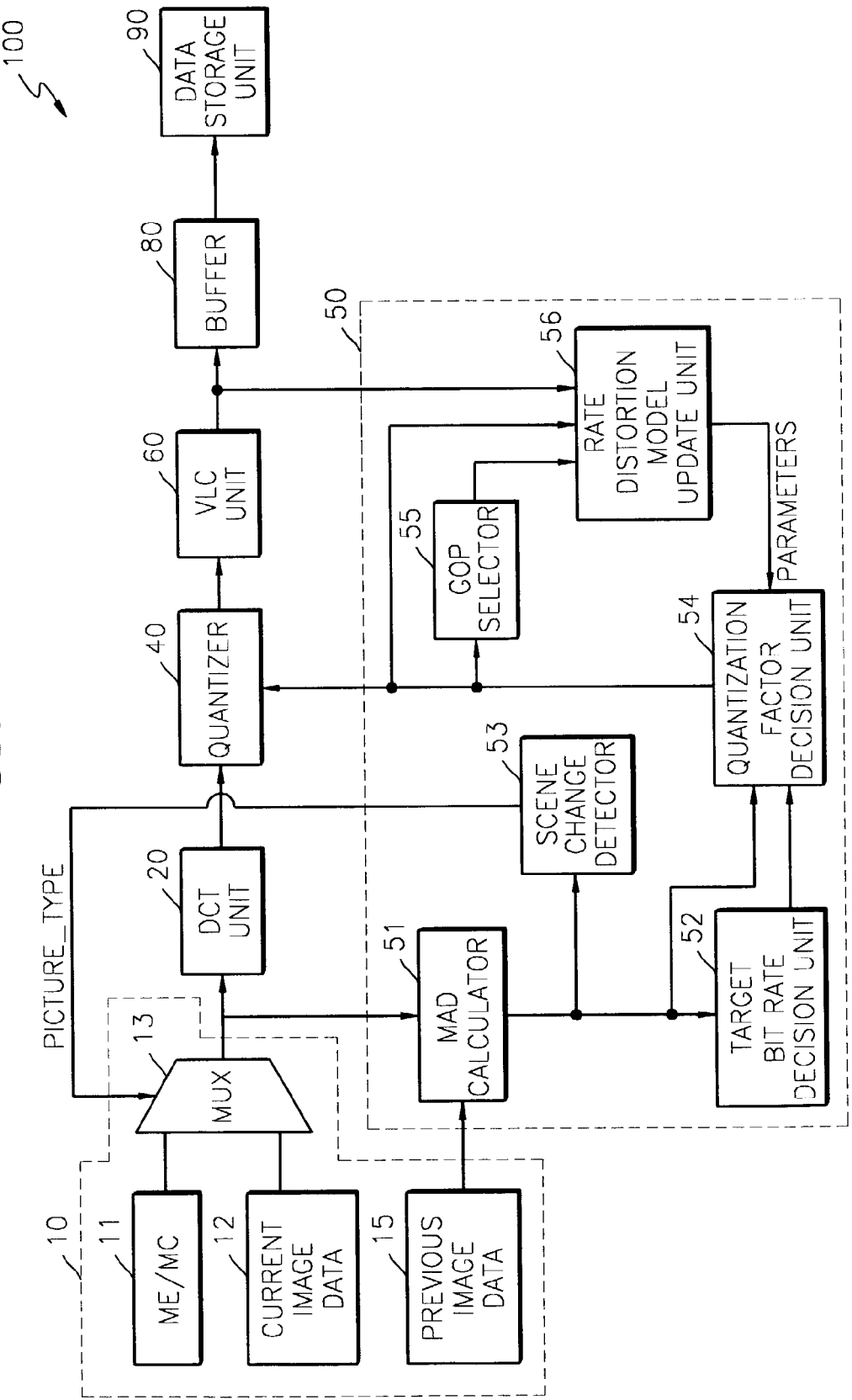
FIG. 1 is a block diagram of a preferred embodiment of an encoder for use in a video recording system to which variable bit rate ("VBR") control algorithm is applied, according to the present invention.

FIG. 1 is a block diagram of a preferred embodiment of an encoder 100 for use in a video recording system to which variable bit rate ("VBR") control algorithm is applied. Referring to FIG. 1, the encoder 100 includes a data input unit 10, a discrete cosine transformer (hereinafter, "DCT") 20, a quantization unit 40, a VBR controller 50, a variable-length coding ("VLC") unit 60, a buffer 80, and a data storage unit 90.

The data input unit 10 includes a motion estimation ("ME")/motion compensation ("MC") data 11, a multiplexer 13 that is a switching means for selecting one of present video data 12 and the ME/MC data 11, and a frame memory 15 for storing the previous video data.

The VBR controller 50 includes a mean absolute difference ("MAD") calculator 51, a target bit-rate decision unit 52, a scene change detector 53, a quantization factor decision unit 54, a group-of-pictures ("GOP") selector 55, and a rate distortion function updating unit 56.

The DCT 20, the quantization unit 40 and the VCL unit 60 perform general texture encoding that is standardized in H.263, MPEG-4, and the like. Here, the texture encoding is a process of actually compressing video data. Most part of data can be lost during the quantization performed by the quantization unit 40. Much loss in data results in an increase in encoding efficiency and deterioration of the quality of an image at once. For this reason, the encoder 100 has to perform encoding with an appropriate qantization factor Q that minimizes deterioration of the quality of an image while increasing the encoding efficiency. Accordingly, an efficient rate control algorithm, which determines a quantization factor, is indispensable in encoding video data. For the control of rate, the VBR controller 50 according to the present invention allocates a bit estimate effectively and determines an appropriate quantization factor.

The structure and operations of the VBR controller 50 will now be described in detail.

The MAD calculator 51 receives the present video data 12 from the multiplexer 13, receives the previous video data 15 from the frame memory, and then calculates the absolute values of differences between pixels in the present frame and in the reconstructed previous frame and an average value of the absolute values. Here, the resulting value is called a mean absolute difference ("MAD"). The obtained MAD value expresses complexity of the present frame numerically and is calculated by the following:

$$MAD = \frac{1}{N}\sum_{i=1}^{N} |Xi - X'i| \tag{1}$$

wherein N, Xi and X'i denote the number of pixels, a pixel value of the present frame, and a pixel value of the reconstructed previous frame, respectively.

The MAD value, which is calculated by the MAD calculator 51, is input to the target bit rate decision unit 52, the scene change detector 53, and the quantization factor decision unit 54.

The scene change detector 53 detects a scene change in response to the MAD value and outputs the result to the multiplexer 13 included in the data input unit 10. Then, the multiplexer 13 receives the result output from the scene change detector 53 and transmits it as data to be encoded to the DCT 20.

A condition where the scene change detector 53 detects a scene change is as follows:

$$\text{current}MAD > n \times MAD\text{average (or previous)} \tag{2}$$

Figure 2:
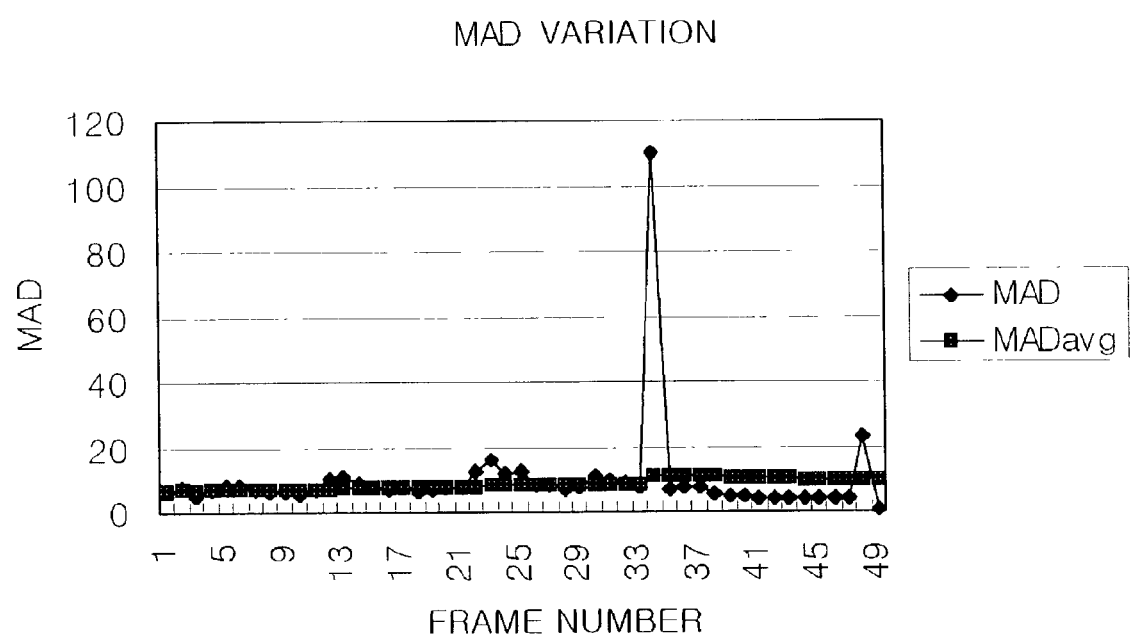
FIG. 2 is a view explaining a variation in a mean absolute difference ("MAD") in a test sequence "Table Tennis" having a scene change.

FIG. 2 is a view of a variation in an MAD in a test sequence "Table Tennis" having a scene change. From FIG. 2, it is noted that there is a marked variation in a portion in which a scene change occurs, at which time the condition expressed in equation 2 is satisfied, i.e., when a change in a scene is detected.

In general, an encoder encodes video data by performing inter coding, which encodes frames into P type so as to use the correlations between frames, on frames. However, when there is a change in a scene, the correlation between frames is lowered, which fades the advantage of the inter coding of the video data and the video data becomes weak to an error. Therefore, the encoder 100 according to the present invention detects a scene change via the scene change detector 53, and performs intra coding on a related frame from a P-type picture to a I-type picture when a scene change is detected, thereby regularly maintaining the quality of an image.

As described above, the MAD is used in detecting a scene change by the scene change detector 53, but a motion vector ("MV") may be used instead of MAD.

Meanwhile, the target bit rate decision unit 52 sets an overall bit estimate, which is to be used in a video recording system such as a digital camera or a digital camcorder, using the MAD calculated by the MAD calculator 51.

Figure 3:
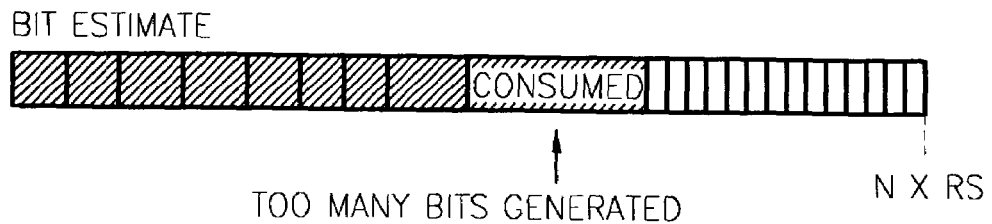
FIG. 3 is a view of an overall bit estimate that is allocated equally to each frame in a recording system by a general allocation method.

FIG. 3 is a view of an overall bit estimate to be allocated equally per frame for a recording system. Referring to FIG. 3, n denotes recording time, and Rs denotes a target quantity of bit to be stored per second.

To record video data in a video recording system in real time, the overall bit estimate must first be determined. However, it is difficult to estimate how long it will take to record video data when video data is encoded in real time by a video input device, which difficult it to exactly allocate a bit estimate for a frame. For this reason, the encoder 100 allocates predetermined quantity of the bit estimate per frame at the beginning of the encoding, and continues the allocation of the bit estimate as time goes by. As shown in FIG. 3, the easiest way is to equally allocate the bit estimate required for n second(s) to each frame every n second. At this time, the allocated overall bit estimate is expressed as n×Rs, and the quantity of bit to be allocated per frame is calculated by the following:

$$R = (Rr/Nr) \tag{3}$$

wherein R, Rr and Nr denote the quantity of bit to be allocated per frame, the quantity of available bit, and the number of frames to be encoded, respectively.

For instance, if n is 5 and a target bit rate is 512 Kbps, an available overall estimate Rr is 5×512K bit. Also, if the frame rate is 15 frames/sec, the number Nr of frames, which is to be initially encoded, is 5×15, and as a result, the quantity of bit to be allocated to a first frame is about 34.1K bit.

However, in case that the quantity of bit increases in some frames, the scant remainder of the bit estimate is equally divided and allocated to the other frames, which causes the deterioration of the quality of an image. To solve this problem, the target bit rate decision rate decision unit 52 according to the present invention determines the quantity of bit estimate to be sufficiently allocated per frame, using VBR characteristics. Thus, even if a bit rate increases largely in the previous frame(s), the remaining frames are given sufficient quantity of the bit estimate, thereby preventing the deterioration of the quality of an image.

Figure 4:
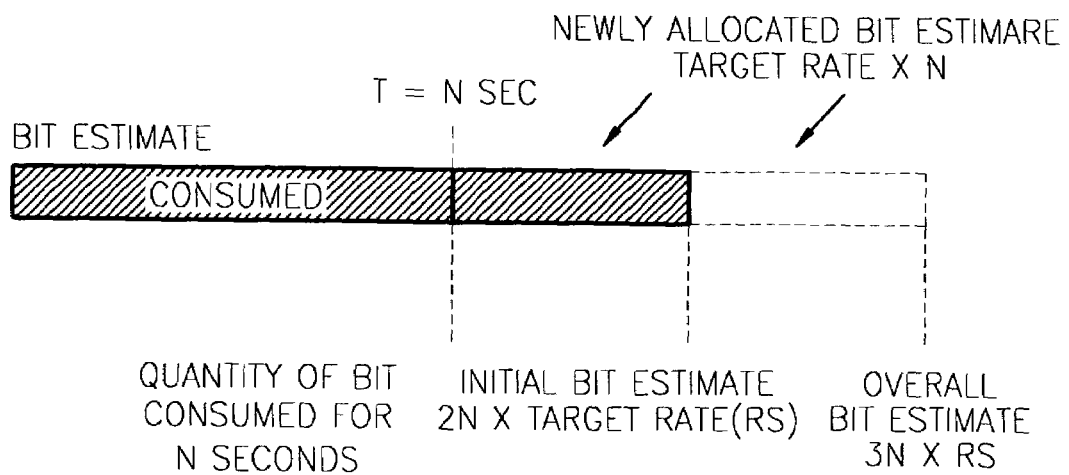
FIG. 4 is a view of a preferred embodiment of an overall bit estimate that is allocated for each frame by an allocation method according to the present invention.

FIG. 4 is a view of a preferred embodiment of an overall bit estimate that is allocated for each frame according to the present invention. Referring to FIG. 4, a bit estimate required for m×n time is set as an initial bit estimate, and a bit estimate required for n time is allocated whenever n time passes during the encoding of video data (m and n are integers).

In this case, assuming n is 5 seconds, a bit estimate required for 10 seconds is allocated as an initial allocation, a bit estimate required for every five second is additionally allocated, thereby enabling the allocation of sufficient bit estimate. This allocation of bit estimate results in a reduction in a quantization rate by 5% on average, and a variation in the quantization rate decreases by about 10%.

Meanwhile, the complexity of a frame must be considered in determining the quantity of bit rate to be allocated to each frame. In the event that a lot of bits are produced in the previous frame, the previous frame can be considered a complicated image and there is a higher probability that the next frame is also a complicated image. In general, the frame rate of a digital moving image is 8 frames/second or more, and the features of frames of the digital moving image are similar. Therefore, the complexity of the present frame has a high correlation with that of the previous frame. Therefore, it is possible to estimate the quantity of bit to be allocated to the present frame referring to the quantity of bit rates in the previous frame.

Thus, the quantity of bit to be allocated to the present frame is determined in consideration of an available overall bit estimate and the complexity of the previous frame, which can be expressed as follows:

$$R=(Rr/Nr) \times m + \text{(the quantity of bit produced in the previous frame)} \times n \quad (4)$$

wherein R denotes the quantity of bit to be allocated to each frame, Rr denotes the quantity of available bit, and Nr denotes the number of frames to be encoded. Also, m+n=1.

To more effectively allocate the target quantity of bits to each frame in consideration of the VBR characteristics, the MAD, which is calculated by the MAD calculator 51, may be used. The MAD is a barometer that determines the complexity of the present frame. If the present MAD is higher than an average MAD, the present frame has more bit than the average quantity of bits. Accordingly, the target quantity of bits can be more effectively allocated to each frame by allocating many bits to a frame having a large MAD, which can be expressed as follows:

$$R = X1 \times MAD \times Q^{-1} + X2 \times MAD \times Q^{-2} \quad (5)$$

wherein R denotes the target quantity of bit to be allocated to each frame, which is calculated by dividing the quantity of an available overall bit by the number of P frames to be encoded. X1 and X2 denote parameters required in updating a rate distortion function that is expressed by equation 5, and MAD denotes a numerical value that expresses the complexity of the encoding of video data.

As shown in equation 1, MAD represents an average value of the absolute values of differences between pixels in the present frame and pixels in a previous reconstructed frame. Therefore, the calculation of MAD is considerable when estimating the production rate of bits, unless there is additional hardware capable of controlling VBR. To reduce the load of calculating MAD, the calculation is carried out in the unit of a macro block ("MB") using a motion vector ("MV") that represents information of a movement. In this case, the calculation using the MV is reduced to one hundredth of that of the calculation using MAD.

The application of the MV to the estimation of the production rate of bits is understood that the complexity of a frame is measured by analyzing the MV. That is, it is possible to predict the production rate of a bit by the degree of the activity and the motion of an object. According to the present invention, the production rate of bits is measured with a mean absolute value of the MV and a mean absolute value of differences in the MV between neighboring macro blocks.

A mean absolute value of MV can be calculated by the following:

$$|MV| = \frac{1}{N}\sum_{i=1}^{N}(|MVxi| + |MVyi|) \quad (6)$$

wherein N denotes the number of macro blocks, MVxi denotes a horizontal substance of the MV, and MVyi denotes a vertical substance of the MV.

The faster the movement of video data is, the higher the activity of the video data is, the larger |MV| obtained in equation 6 is. If the movement and activity of video data are faster and higher, the amount of motion between frames is large and the production rate of bits increases.

A mean absolute difference ("MAD") in MV between adjacent macro blocks is calculated by the following:

$$M\_dif = \left[\frac{1}{V}(H-1)\sum_{j=1}^{V}\sum_{i=1}^{H-1}(|MVxj,i+1 - MVxj,i| + |MVyi,i+1 - MVyj,i|) + \frac{1}{H}(V-1)\sum_{i=1}^{H}\sum_{j=1}^{V-1}(|MVxj+1,i - MVxj,i| + |MVyi+1,i - MVyj,i|)\right] \quad (7)$$

wherein M_dif denotes an MAD of the MV, H indicates the number of horizontal macro blocks, and V indicates the number of vertical macro blocks. MVxj, i denotes an x-substance of the MV with respect to the present macro block, MVyj, i denotes an y-substance of the MV with respect to the present macro block, MVxj, i+1 denotes an x-substance of the MV with respect to the next horizontal macro block, MVyj, i+1 denotes an y-substance of the MV with respect to the next horizontal macro block, MVxj+1, i denotes an x-substance of MV with respect to the next vertical macro block, and MVyj+1, i denotes an y-substance of MV with respect to the next vertical macro block.

The MAD M_dif expressed in equation 7, can be obtained by calculating an average value of absolute values of differences between horizontal macro blocks and calculating an average value of absolute values of differences between macro vertical blocks. If the mean absolute values in the horizontal and vertical directions are weighted, the results can express the complexity of the present frame, instead of MAD. The fast the movement of video data is and the higher the activity of the video data is, the more the MAD M_dif increases, at which time the amount of motion between frames is large and the production rate of bits increases.

In the present invention, in case that the target bit rate is determined in consideration of the MV, the production rate of bit is estimated in consideration of 50% of the mean absolute value |MV| of MV expressed in equation 6 and 50% of the MAD M_dif of MV per macro block expressed in equation 7.

As described above, after the allocation of target bit rate to the present frame, the quantization factor decision unit 54 calculates a quantization factor Q in response to the MAD calculated by the MAD calculator 51 and the target bit rate R determined by the target bit rate decision rate 52. The calculated quantization factor is a value that determines the degree of deterioration of the quality of an image and also used as a value that divides DCT coefficients calculated by the DCT 20.

In general, an image of good quality is considered an image, having less mean distortion, i.e., mean quantization factor, especially, an image whose good quality is maintained. To maintain the quality of an image, it is required to effectively allocate bit to each frame while minimizing a variation in the quantization factor.

However, in a case where different video data is input to frames, a variation in the quantization factor still becomes larger if a quantization factor is individually calculated and applied without being readjusted during quantization whenever necessary. Therefore, in the present invention, a variation in the quantization factor is controlled to regularly maintain the quality of an image. Here, the quantization factor is readjusted by setting the maximum and minimum variations between frames in a limited range by the following equation and then setting the maximum and minimum values defined in the standard video compression:

$Q(t) = \min((1+K) \times Q(t-1), Q'(t), 31)$ $Q(t) = \max((1-K) \times Q(t-1), Q'(t), Qmin), Qmin = 6$ (8)

wherein Q(t) denotes a quantization factor to be used in the present frame, Q'(t) denotes a quantization factor calculated by a rate distortion function, Q(t−1) denotes a quantization factor for use in the previous frame, and K denotes a coefficient of a quantization factor variation.

The minimum quantization factor Qmin is defined as 1 in a verification function ("VM") of MPEG-4, whereas it is defined as 6 in the present invention, which is based on facts that the quality of an image does not largely change if the minimum quantization factor Qmin falls within a range from 1 to 6, and that a complicated image is displayed with a reduced bit rate if the minimum value Qmin of the quantization factor is set to be 6.

If the quantization factor Q'(t), which is calculated using a rate distortion function, falls within a range of (1±K)Q(t−1), this factor can be used without being readjusted. If not so, (1+K)Qp(t−1) or (1−K)Qp(t−1) is determined as the quantization factor Q'(t). Here, K is a value that varies according to the present status and is used as a parameter that determines the final quantization factor. A variation in the quantization factor is finally controlled by adjusting the value K by the following equation:

$Q(t) = (1 \pm K) \times Q(t-1)$, where $K = L \times D$ $D = r/(1+L)$, where $1 \leq r < 1+L$ $D = (1-L)/r$, where $1-L < r < 1$ $D = 1$, otherwise (9)

wherein L is a limitation parameter that is used to determine the upper value of the value K, and D is a deviation parameter that is used to determine the degree of a variation in the value K.

Figure 5:
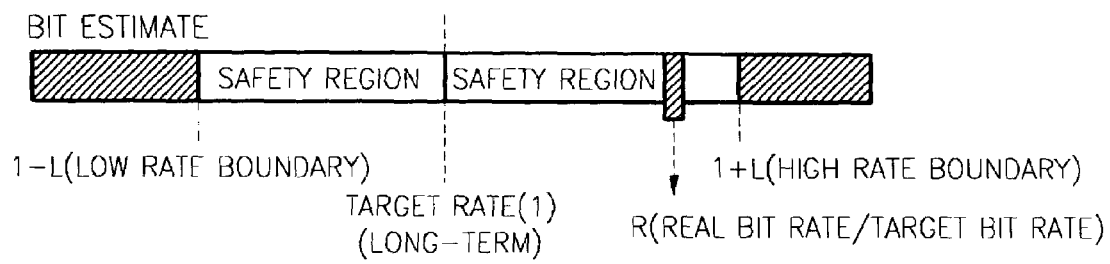
FIG. 5 is view of a range of rate allowed by a VBR encoder according to the present invention.

FIG. 5 is a view of the range of a rate allowed by an encoder 100 that is adjusted by equation 9. Referring to FIG. 5, safe regions are first set with respect to a bit rate. Here, the safe region denotes the range of a rate that is allowed by the encoder 100. Next, a parameter r, which represents a degree how the production rate of the present bit deviates from a target bit rate, i.e., the present status, is determined. The parameter r is defined as a value that is obtained by dividing the actual production rate of bit by the target bit rate. For instance, if the target bit rate is 1 and the parameter r is larger than 1, it is understood that many bits are produced, whereas if the target bit rate is 1 and the parameter r is smaller than 1, little bits are produced. In addition, the limitation parameter L is used in determining the safety regions, as well as an allowable range of a variable quantization factor.

The deviation parameter D is determined by the parameter r. For instance, in the event that r≥1 and r<1+L, the deviation parameter D is r/(1+L) and indicates the degree that the present bit rate deviates from a target bit rate. The value K is adjusted according to the deviation degree. At this time, the present status parameter r is larger than 1+L, the present bit rate does not fall within the allowable range. As a result, the deviation parameter D becomes 1 and the value K has the limitation value L that is the maximum value. In other words, the quantization factor Q(t) of the present frame is allowed to increase by L×100% compared to the quantization factor Q(t−1) of the previous frame. Similarly, if the parameter r is between 1−L and 1, the quantity of the present bit is less than that of the target bit, but it falls within a range of allowable bit rate. In this case, the value K is not the largest value, but is adjusted to be within a predetermined range, i.e., K=L×D=(1−L)/r. That is, the parameter K, which determines a degree of a variation in the quantization factor, varies according to difference between the target bit rate and the present bit rate, and increases as the difference becomes larger. The larger the parameter K is, the larger a variation in the quantization factor is. At this time, the parameter K does not exceed a predetermined upper value L.

As previously mentioned, a variation in the quantization factor can be automatically adjusted by the quantity of a bit, because the quantization factor is adjusted by the parameter K and the parameter K increases in proportion to the deviation parameter D. This adjustment results in a reduction in a variation in the quantization factor, thereby maintaining the quality of an image as shown in FIG. 6.

Figure 6:
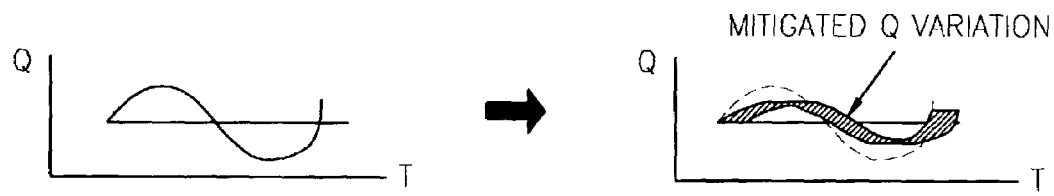
FIG. 6 is a view explaining an effect of controlling variations in a quantization factor.

FIG. 6 is a view explaining an effect caused by adjusting a variation in a quantization factor. From FIG. 6, it is noted a variation in the quantization factor, according to the present invention, is mitigated more than in the prior art. While lessening the quantization factor, it is possible to regularly and maximally maintain the quality of an image using a limited bit rate.

To adjust a variation in the quantization factor, it is important to check the level of a buffer to see if overflow or underflow occurs in the buffer. For instance, if the level of the buffer reaches above a predetermined level, overflow may occur in the buffer. In this case, the present quantization factor is adjusted to be higher in a range of the maximum variation than the previous quantization factor.

After the quantization by the quantization unit 40, the GOP selector 55 classifies frames into GOP according to the complexity of a frame in response to a quantization factor that is determined by the quantization factor decision unit 54. Then, parameters X1 and X2 of a rate distortion function are updated by the rate distortion function updating unit 56. More specifically, these parameters X1 and X2 are updated with the quantity of bit and quantization factors in the previous frames just before the encoding of each frame. Here, the quantity of bits and quantization factors of the previous frames are called 'data points'. The selection of appropriate data points enables the exact quantization factor to be obtained.

For the selection of appropriate data points, a group-of-pictures ("GOP") or set-of-pictures ("SOP") idea that frames having similar complexity are grouped into GOP, is adopted in the present invention. As a result, since frames having the similar quantity of bit are grouped into GOP, data points in the same GOP group are selected and used. Therefore, more appropriate data points can be selected.

As previously mentioned, that frames are classified by the quantity of generated bit has the same meaning as that frames are classified by quantization factors. That is, an image is considered as being complicated in case that quantization factors become larger although the quantity of bit is adjusted by the target bit rate decision unit 52. Therefore, if frames are divided into GOP according to quantization factors, frames having similar complexity belong to the same GOP and data points can be selected only from the same GOP. As a result, the rate distortion function parameters X1 and X2 are updated using frames having similar complexity.

Here, the number of frames per GOP is not fixed and the maximum and minimum numbers of frames are determined within the GOP. In the present invention, through experiments, the number of frames for each GOP is determined in a range from 3 to 100.

In addition, since the effect of the classification of frames of an image into GOP does not depend on whether the frames are classified by quantization factor or the quantity of bit, frames are grouped into GOP according to a variation in a quantization factor in the present invention.

Figure 7:
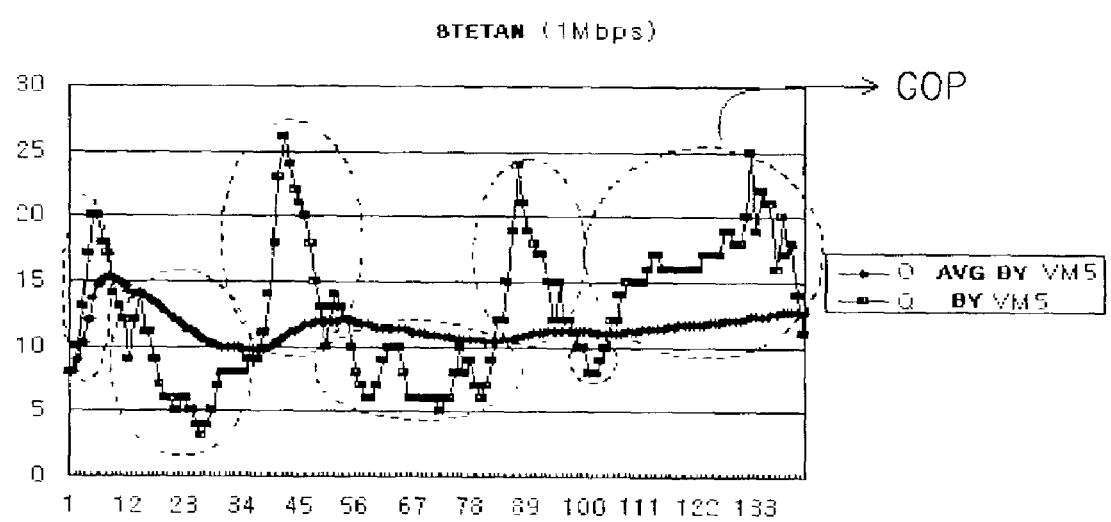
FIG. 7 is a view of frames that are grouped into GOP according to a variation in a quantization factor.

FIG. 7 is a graph explaining that frames are grouped into GOP according to a variation in a quantization factor. The graph of FIG. 7 shows a variation in a quantization factor with respect to a "Stefan" sequence that is a test video. With an average quantization factor Qavg as a reference, the lower portion is classified as a frame of low complexity, the upper portion is classified as a frame of high complexity, and the classified frames form GOP. Such a classification of frames prevents the selection of data points from frames having different characteristics.

However, when a lot of bits are produced due to a sudden increase in the motion of a frame and a change in the activity of the frame, the quantization factor increases at high speed so as to approximate a target bit rate. Although a variation in the quantization factor is limited to a certain level, a sudden increase in the complexity of a frame results in deterioration of the quality of an image. In the present invention, a frame rate is controlled to reduce deterioration of the quality of an image caused by a sudden increase in the complexity of the frame.

There are various methods of controlling a frame rate, but a method of controlling a frame rate according to the present invention is simple because the frame rate is reduced only when all of the following conditions are satisfied:

1) Q>n×Qaverage (n is an integer);

2) Q>Qprevious occurs y times in series (y is an integer);

3) the present level of a buffer is more than m % of the size of the buffer (m is an integer);

4) frame skipping does not occur in k previous frames (k is an integer); and 5) continuous speedy frames are detected.

When the first and second conditions are satisfied, a continuous increase in the quantization factor can be detected, and the occurrence of underflow in a buffer can be prevented by satisfying the third condition when the frame rate decreases. In addition, the reason why the fourth condition is satisfied is not to reduce a frame rate in a portion that is easy to be visually recognized. To satisfy the fifth condition is to use visual insensitiveness to the fast motion of a frame.

With a method of adjusting a frame rate according to the present invention, a sudden increase in a quantization factor can be prevented using human insensitiveness to the fast movement of a frame, thereby reducing severe deterioration of the quality of an image.

Figure 8:
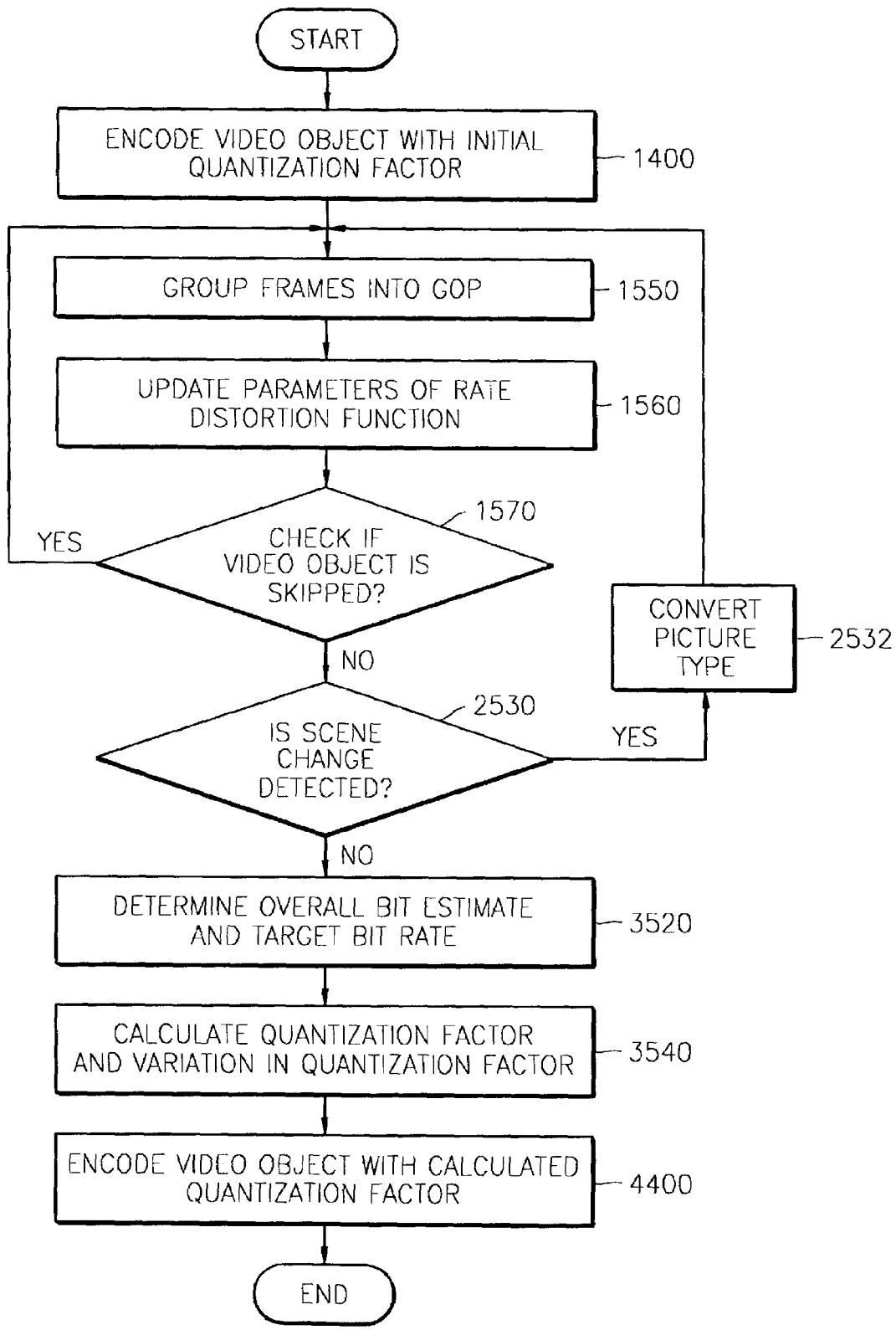
FIG. 8 is a flow chart explaining a method of controlling VBR in an encoder according to the present invention.

FIG. 8 is a flow chart explaining a method of controlling a variable bit rate of an encoder 100 according to the present invention. Referring to FIG. 8, the encoder 100 encodes a video object using an initial quantization factor (step 1400). Next, frames are grouped into GOP according to the complexity of a frame (step 1500), and then, parameters X1 and X2 of a rate distortion function is updated (step 1560). Thereafter, the state of a buffer is checked to determine whether the video object must be skipped or not (step 1570). If it is determined in step 1570 that the video object is skipped, frames are grouped into GOP, returning to step 1550.

If it is determined in step 1570 that the video object is not skipped, it is checked whether a scene changes (step 2530). Here, the scene change is detected by MAD or MV according to the constitution of a circuit.

If it is determined in step 2530 that a scene change is detected, a picture type is converted from P type to I type (step 2532) and it is returned to step 1550. However, if a scene change is not detected in step 2530, overall bit estimate is allocated to each frame and a target bit rate is determined (step 3520). Then, a quantization factor and a variation in the quantization factor are calculated based on predetermined MAD or MV and the target bit rate (step 3540). Thereafter, the video object is encoded with the calculated quantization factor (step 4400).

According to this method shown in FIG. 8, an overall bit estimate can be effectively allocated to each frame and an appropriate quantization factor can be determined. Accordingly, with an encoder of simple structure, it is possible to store video data, which is encoded in real time, without deterioration of the quality of an image.

Hereinafter, a comparison between the performance of an encoder 100 according to the present invention and that of a conventional encoder is made.

The performance of the encoder 100 according to the present invention is tested using an encoding simulator of a C-source level in accordance with the international standard MPEG-4. Here, the aforementioned algorithms are realized with a C code, and the profile of the encoder 100 is realized with respect to simple profile.

Assuming that n is 5, Tables 1 shows a variation in the performance of an encoder when a bit estimate is allocated to each frame by a conventional allocation method as shown in FIG. 3, and Table 2 shows a variation in the performance of the encoder 100 when a bit estimate is allocated to each frame by an allocation method according to present invention as shown in FIG. 4.

TABLE 1

|  | Prior Art | | Present Invention | |
| --- | --- | --- | --- | --- |
|  | $\overline{Q}$ | $\sigma_Q$ | $\overline{Q}$ | $\sigma_Q$ |
| Coastguard (CIF, 512 Kbps) | 9.37 | 1.41 | 9.10 | 1.29 |
| Stefan (CIF, 1 Mbps) | 11.96 | 5.11 | 11.80 | 4.63 |

TABLE 2

|  | Prior Art | | Present Invention | |
| --- | --- | --- | --- | --- |
|  | $\|Qp(t) - Qp(t-1)\|$ | Average of Actual Amount of Bit | $\|Qp(t) - Qp(t-1)\|$ | Average of Actual Amount of Bit |
| Coastguard (CIF, 512 Kbps) | 0.29 | 490,918 | 0.30 | 499,733 |
| Stefan (CIF, 1 Mbps) | 1.36 | 969,523 | 1.22 | 974,396 |

In table 1, $\overline{Q}$ indicates a total average of quantization factors, $\sigma_Q$ denotes the standard deviation of quantization factors. In table 2, $|Qp(t)-Qp(t-1)|$ indicates a mean absolute difference in a quantization factor between frames, which represents the degree of an instant variation in quantization factors between the present frame and the previous frame.

Referring to table 1, each video sequence according to the present allocation method has a smaller quantization factor and a less variation in a quantization factor than the conventional method. Especially, a variation in the quantization factor according to the present invention is much less than that in the conventional method, which reduces deterioration of the quality of an image.

Figure 9:
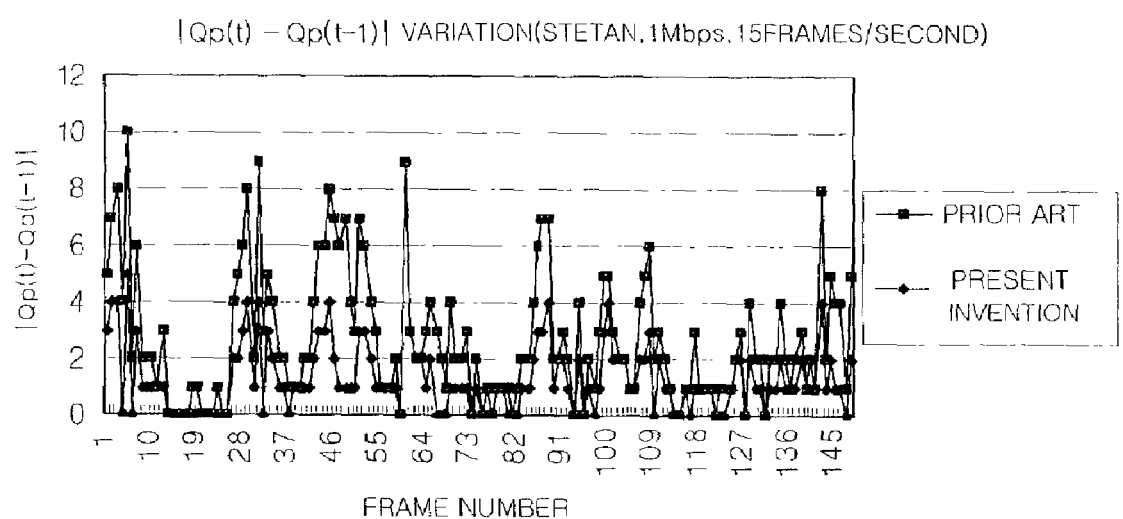
FIG. 9 is a view of a variation in an instant quantization factor according to a conventional bit estimate allocation method and a bit estimate allocation method according to the present invention, indicated in table 2.

FIG. 9 is a view of variations in an instant quantization factor when using a conventional bit estimate allocation method and a bit estimate allocation method according to the present invention, indicated in table 2. From table 2 and FIG. 9, it is noted that a variation in an instant quantization factor when using the method according to the present invention is less than when using the conventional method. Therefore, with a bit estimate allocation method according to the present invention, it is possible to regularly maintain the quality of a video image.

As previously mentioned, MAD or MV may be used as a distortion measurement means for use in the control of a variable bit rate. A variation in the performance of the encoder 100 when MAD and MV are used is as shown in table 3 and FIGS. 10 and 11.

TABLE 3

|  | Present Invention (when using MAD) | | Present Invention (when using MV) | |
| --- | --- | --- | --- | --- |
|  | $\overline{Q}$ | $\sigma_Q$ | $\overline{Q}$ | $\sigma_Q$ |
| Coastguard (CIF, 512 Kbps) | 9.37 | 1.97 | 9.44 | 2.21 |
| Stefan (CIF, 1 Mbps) | 11.96 | 5.11 | 12.01 | 5.10 |

In Table 3, $\overline{Q}$ indicates a total average of quantization factors, and $\sigma_Q$ indicates the standard deviation in quantization factors.

Figure 10:
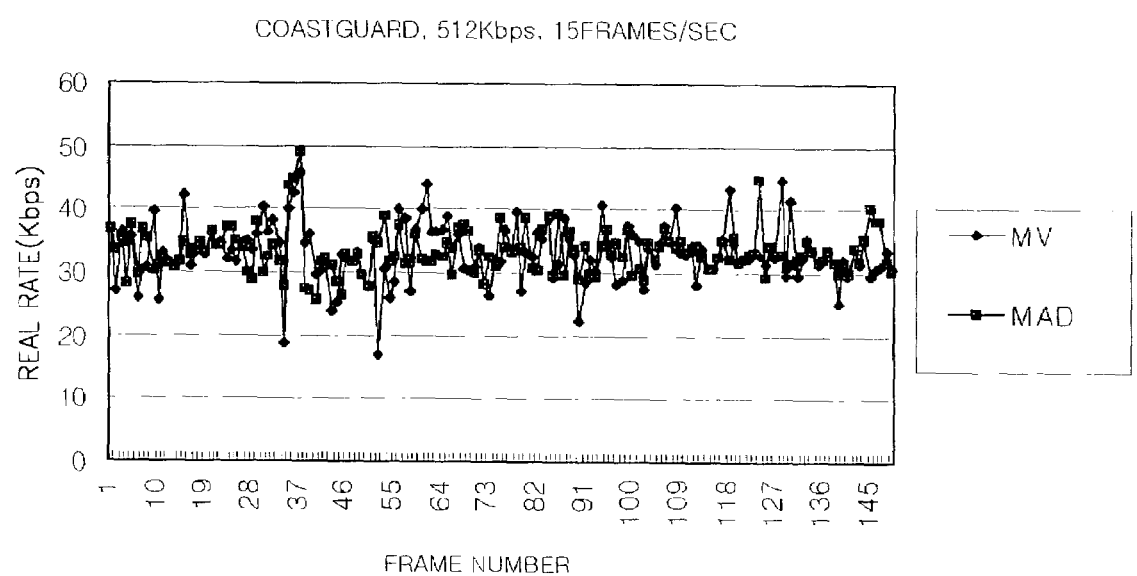
FIG. 10 is a view of a variation in a bit when MAD and a motion vector ("MV") are used in controlling VBR with respect to a "Coastguard" video sequence.
Figure 11:
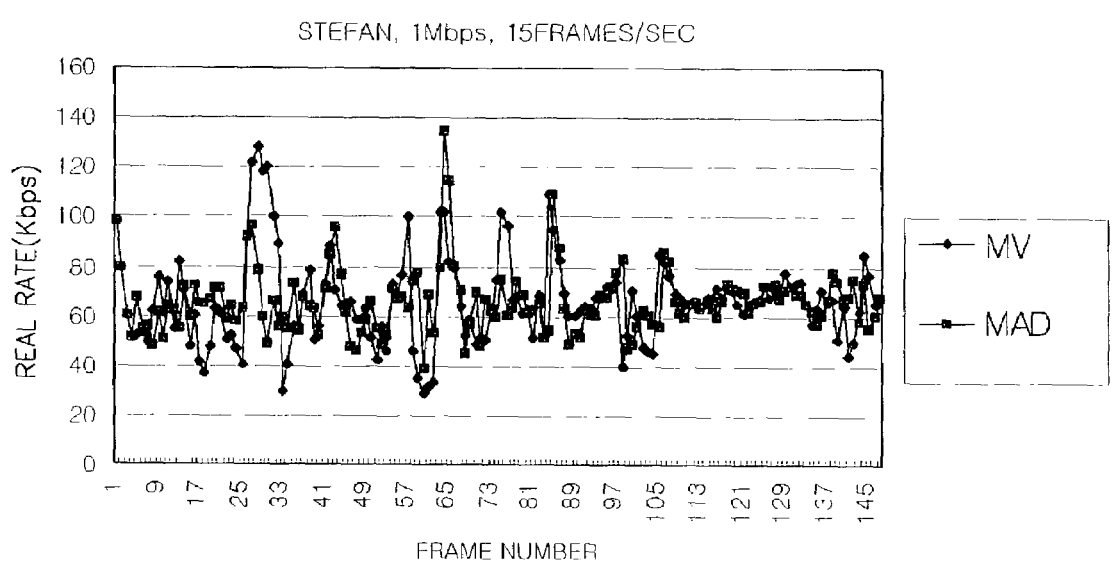
FIG. 11 is a view of a variation in a bit when MAD and MV are used in controlling VBR with respect to a "Stefan" video sequence.

FIGS. 10 and 11 are views of variations in bit when using MAD and MV are used to control a variable bit rate with respect to a "Coastguard" video sequence and a "Stefan" video sequence, respectively.

Referring to table 3 and FIG. 10, the "Coastguard" video sequence has a smaller quantization factor and a less variation in the quantization factor when using MAD in controlling a variable bit rate in the quantization factors than when using MV.

Referring to Table 3 and FIG. 11, the performance of the active "Stefan" video sequence does not considerably change independently with whether a variable bit rate is controlled using MAD or MV. More specifically, the performance of the "Stefan" video sequence is better when the variable bit rate is controlled using MAD rather than using MV. However, the amount of calculation when using MAD is more than when using MV. Therefore, preferably, MAD or MV is appropriately selected for a given system when controlling the variable bit rate so that both the amount of calculation and the performance of a video sequence are satisfactory.

Tables 4 through 6 show comparisons between a method of controlling a variable bit rate according to the present invention, and a method of controlling a VM5 rate that is adopted by a general MPEG-4. In the following tables, the test results with respect to the present invention and the prior art are obtained assuming that the total time required to record the sequence is not known. Also, the following testing results with respect to VM5 are obtained when a bit estimate is allocated to each frame assuming that the total time required to record the sequence is known.

TABLE 4

|  | Prior Art | | Present Invention | |
| --- | --- | --- | --- | --- |
|  | $\overline{Q}$ | $\sigma_Q$ | $\overline{Q}$ | $\sigma_Q$ |
| Coastguard (CIF, 512 Kbps) | 9.12 | 1.39 | 9.01 | 1.29 |
| Stefan (CIF, 1 Mbps) | 11.95 | 5.05 | 11.80 | 4.32 |
| Table Tennis (SIF, 300 Kpbs) | 12.09 | 3.80 | 11.92 | 3.52 |

TABLE 5

| | VM5 | | Present Invention | |
|---|---|---|---|---|
| | PSNR_Y | Average of Actual Amount PSNR_Y | Average of Actual Amount of Bit | |
| Coastguard (CIF, 512 Kbps) | 32.02 | 507,215 | 32.08 | 507,496 |
| Stefan (CIF, 1 Mbps) | 30.84 | 994,153 | 30.95 | 994,771 |
| Table Tennis (SIF, 300 Kbps) | 31.79 | 290,848 | 31.81 | 297,834 |

TABLE 6

| | Prior Art | | Present Invention | |
|---|---|---|---|---|
| | VAR(PSNR) | $\sigma_{PSNR}$ | VAR(PSNR) | $\sigma_{PSNR}$ |
| Coastguard (CIF, 512 Kbps) | 0.95 | 0.99 | 0.85 | 0.89 |
| Stefan (CIF, 1 Mbps) | 8.99 | 2.99 | 7.51 | 2.66 |
| Table Tennis (SIF, 300 Kbps) | 4.85 | 2.21 | 4.50 | 2.09 |

In table 4, $\overline{Q}$ denotes a total average of quantization factors, and $\sigma_Q$ denotes the standard deviation. In table 5, PSNR_Y indicates peak signal-to-noise ratio of a luminance substance. In table 6, VAR(PSNR) denotes a variation in PSNR, and $\sigma_{PSNR}$ denotes the standard deviation.

Referring to tables 4 through 6, the present invention is more advantageous than VM5 in every respect, especially, the present invention has the remarkably reduced standard deviation of a quantization factor and PSNR, which are required to regularly maintain the quality of an image. Although not shown in Tables 4 through 6, the present invention has also a much higher instant change in a quantization factor, i.e., |Qp(t)−Qp(t−1)|, than VM5. Due to these characteristics, a method of controlling a variable bit rate according to the present invention can provide a high-quality image compared with the existing methods therefor.

While this invention has been particularly described with reference to a preferred embodiment thereof, it will be understood by those skilled in the art that various changes in form and details may be made therein without departing from the spirit and scope of the invention as defined by the appended claims.

The present invention can be embodied as a computer readable code in a computer readable medium. Here, the computer readable medium may be any recording apparatus capable of storing data that can be read by a computer system, e.g., a read-only memory ("ROM"), a random access memory ("RAM"), a compact disc ("CD")-ROM, a magnetic tape, a floppy disk, an optical data storage device, and so on. In addition, the computer readable medium may be a carrier wave that transmits data via the Internet, for example. The computer readable recording medium can be dispersively installed in a computer system connected to a network, and stored and accomplished as a computer readable code by a distributed computing environment.

As described above, in an apparatus and method for controlling a variable bit rate according to the present invention, a bit estimate and a quantization factor are appropriately and effectively determined, thereby remarkably reducing a delay in the coding performed by a real-time system. Therefore, with an encoder of a simple structure, it is possible to store video data, which is encoded in real time, while regularly maintaining the quality of the video data.

What is claimed is:

1. An encoder comprising:
an encoding unit for performing a predetermined image conversion on present video data to be encoded and encoding the video data into a variable bit rate by quantizing the conversion result; and
a variable bit rate controller for allocating an overall bit estimate of the video data, which is to be stored in a system, to each frame according to a variation in video recording time, detecting the complexity of frames based on a difference between pixels of the encoded video data, and determining a quantization factor using the detected complexity,
wherein the variable bit rate controller comprises:
a complexity calculator for allocating the overall bit estimate to each frame according to a variation in video recording time, and detecting the complexity of frames with a difference between pixels of the previous video data and the present video data;
a target bit rate decision unit for determining a target bit rate to be stored in each frame in accordance with the detected complexity;
a scene change detector for detecting a scene change in the present video data in accordance with the detected complexity;
a group-of-picture (GOP) selector for grouping frames of the present video data into GOP having frames of similar complexity;
a rate distortion function updating unit for updating a rate distortion function, which is to be used in calculating the quantization factor, according to the grouping result; and
a quantization factor decision unit for calculating the quantization factor with the complexity, the bit estimate, the target bit rate, and parameters updated by the rate distortion function updating unit.

2. The encoder of claim 1, wherein the encoding unit comprises:
a data input unit for receiving the previous video data and the present video data;
a discrete cosine transformer for performing discrete cosine transformation on the present video data;
a quantization unit for quantizing the discrete cosine transformation result using the quantization factor; and
a variable-length coding unit for performing variable-length coding on the quantization result.

3. The encoder of claim 1, wherein the target bit rate decision unit sets bit estimate required for m×n time as initial bit estimate (m and n are integers), and allocates bit estimate which is required for n time as the overall bit estimate whenever n time passes as the overall bit estimate.

4. The encoder of claim 1, wherein the target bit rate decision unit allocates bit to each frame calculated by the following:

$$R=(Rr/Nr) \times m+\text{(the amount of bit in the previous frame)} \times n, (m+n1)$$

wherein R denotes the amount of bit to be allocated to each frame, Rr denotes the amount of available bit, Nr denotes the number of frames to be encoded.

5. An encoder comprising:
an encoding unit for performing a predetermined image conversion on present video data to be encoded and encoding the video data into a variable bit rate by Quantizing the conversion result; and
a variable bit rate controller for allocating an overall bit estimate of the video data, which is to be stored in a system, to each frame according to a variation in video recording time, detecting the complexity of frames based on a difference between pixels of the encoded video data, and determining a quantization factor using the detected complexity,
wherein the complexity can be expressed as a mean absolute difference (MAD) parameter or a motion vector (MV) parameter, and
wherein the MV parameter comprises an average of absolute values of the amount of motion between frames, and a mean average difference between motion vectors.

6. The encoder of claim 5, wherein the mean absolute value of the amount of motion between frames is calculated by the following:

$$|MV| = \frac{1}{N}\sum_{i=1}^{N}(|MVxi| + |MVyi|)$$

wherein N denotes the number of macro blocks, MVxi denotes a horizontal substance of a motion vector, MVyi denotes a vertical substance of the motion vector.

7. The encoder of claim 5, wherein the average of the absolute values of differences between motion vectors is calculated by the following:

$$M\_dif = \left[\frac{1}{V}(H-1)\sum_{j=1}^{V}\sum_{i=1}^{H-1}(|MVxj,i+1 - MVxj,i| + |MVyj,i+1 - MVyj,i|) + \frac{1}{H}(V-1)\sum_{i=1}^{H}\sum_{j=1}^{V-1}(|MVxj+1,i - MVxj,i| + |MVyj+1,i - MVyj,i|)\right]$$

M_dif denotes an MAD, H indicates the number of horizontal macro blocks, and V indicates the number of vertical macro blocks. MVxj, i denotes an x-substance of the MV with respect to the present macro block, MVyj, i denotes an y-substance of the MV with respect to the present macro block, MVxj, i+1 denotes an x-substance of the MV with respect to the next horizontal macro block, MVyj, i+1 denotes an y-substance of the MV with respect to the next horizontal macro block, MVxj+1, i denotes an x-substance of MV with respect to the next vertical macro block, and MVyj+1, i denotes an y-substance of MV with respect to the next vertical macro block.

8. The encoder of claim 1, wherein the scene change detector recognizes that a scene change occurs when the complexity of the present frame is predetermined times as large as an average complexity or the complexity of the previous frame.

9. The encoder of claim 1, wherein the scene change detector converts picture type of a frame from P type to I type, and performs intra coding on the frame.

10. The encoder of claim 1, wherein the GOP selector groups frames into GOP having frames of similar complexity according to the quantization factor, and outputs the result to the rate distortion function updating unit.

11. The encoder of claim 10, wherein the rate distortion function updating unit updates parameters X1 and X2 to be used in updating the rate distortion function according to the quantization factor determined by the quantization factor decision unit, and the variable-length coding result performed by the variable-length coding unit, when the GOP is formed by the GOP selector.

12. The encoder of claim 11, wherein the quantization factor decision unit determines the quantization factor according to the complexity calculated by the complexity calculator, the target bit rate determined by the target bit rate decision rate, and the parameters X1 and X2 updated by the rate distortion function updating unit.

13. The encoder of claim 1, wherein the quantization factor decision unit sets the upper and lower values of the quantization factor, and control the quantization factor to change within the upper and lower values.

14. The encoder of claim 1, wherein the quantization factor decision unit calculates the quantization factor by the following:

$Q(t)=(1\pm K)\times Q(t-1)$, where $K=L\times D$ $D=r/(1+L)$, where $1\leq r<1+L$ $D=(1-L)/r$, where $1-L<r<1$ $D=1$, otherwise wherein L denotes a limited parameter, D denotes a deviation parameter, r denotes a parameter that represents a deviation of the amount of the present bit with respect to the amount of the target bit, Q(t) denotes the present quantization rate, and Q(t−1) denotes the previous quantization rate.

15. An encoder comprising:
an encoding unit for performing a predetermined image conversion on present video data to be encoded and encoding the video data into a variable bit rate by quantizing the conversion result; and
a variable bit rate controller for allocating an overall bit estimate of the video data, which is to be stored in a system. to each frame according to a variation in video recording time, detecting the complexity of frames based on a difference between pixels of the encoded video data, and determining a quantization factor using the detected complexity,
wherein the encoding unit further comprises a frame rate controller for decreasing a frame rate for the prevention of deterioration of the quality of an image, when a lot of bits are produced due to a sudden increase in the motion of a frame and an increase in the activity of the frame.

16. An encoder comprising:
- an encoding unit for performing predetermined conversion on the present video data to be encoded and encoding the video data into a variable bit rate by quantizing the conversion result;
- a complexity calculator for allocating overall bit estimate of the video data to each frame according to a variation in video recording time and detecting the complexity of the frame with a difference between pixels of the previous video data and the present video data;
- a target bit rate decision unit for determining a target bit rate to be stored in each frame in accordance with the detected complexity;
- a scene change detector for detecting a scene change in the present video data in accordance with the detected complexity;
- a group-of-picture (GOP) selector for grouping frames of the present video data into GOP having frames of similar complexity;
- a rate distortion function updating unit for updating a rate distortion function, which is to be used in calculating a quantization factor, according to the grouping result; and
- a quantization factor decision unit for calculating the quantization factor with the complexity, the bit estimate, the target bit rate, and parameters updated by the rate distortion function updating unit.

17. The encoder of claim 16, wherein the encoding unit comprises:
- a data input unit for receiving the previous video data and the present video data;
- a discrete cosine transformer for performing discrete cosine transformation on the present video data;
- a quantization unit for quantizing the discrete cosine transformation result using the quantization factor; and
- a variable-length coding unit for performing variable-length coding on the quantization result.

18. The encoder of claim 16, wherein the target bit rate decision unit sets bit estimate required for m×n time as initial bit estimate (m and n are integers), and allocates bit estimate which is required for n time as the overall bit estimate whenever n time passes.

19. The encoder of claim 16, wherein the target bit rate decision unit allocates bit to each frame calculated by the following:

$$R = (Rr/Nr) \times m + \text{(the amount of bit in the previous frame)} \times n, \quad (m+n=1)$$

wherein R denotes the amount of bit to be allocated to each frame, Rr denotes the amount of available bit, Nr denotes the number of frames to be encoded.

20. The encoder of claim 16, wherein the complexity can be expressed as a mean absolute difference (MAD) parameter or a motion vector (MV) parameter, wherein the MV parameter comprises an average of absolute values of the amount of motion between frames, and a mean absolute difference between motion vectors.

21. The encoder of claim 20, wherein the mean absolute value of the amount of motion between frames is calculated by the following:

$$|MV| = \frac{1}{N} \sum_{i=1}^{N} (|MVxi| + |MVyi|)$$

wherein N denotes the number of macro blocks, MVxi denotes a horizontal substance of a motion vector, MVyi denotes a vertical substance of the motion vector.

22. The encoder of claim 20, wherein the average of the absolute values of differences between motion vectors is calculated by the following:

$$M\_dif = \left[ \frac{1}{V}(H-1) \sum_{j=1}^{V} \sum_{i=1}^{H-1} (|MVxj, i+1 - MVxj, i| + |MVyj, i+1 - MVyj, i|) + \frac{1}{H}(V-1) \sum_{i=1}^{H} \sum_{j=1}^{V-1} (|MVxj+1, i - MVxj, i| + |MVyj+1, i - MVyj, i|) \right]$$

M_dif denotes an MAD, H indicates the number of horizontal macro blocks, and V indicates the number of vertical macro blocks. MVxj, i denotes an x-substance of the MV with respect to the present macro block, MVyj, i denotes an y-substance of the MV with respect to the present macro block, MVxj, i+1 denotes an x-substance of the MV with respect to the next horizontal macro block, MVyj, i+1 denotes an y-substance of the MV with respect to the next horizontal macro block, MVxj+1, i denotes an x-substance of MV with respect to the next vertical macro block, and MVyj+1, i denotes an y-substance of MV with respect to the next vertical macro block.

23. The encoder of claim 16, wherein the scene change detector recognizes that a scene change occurs when the complexity of the present frame is predetermined times as large as an average complexity or the complexity of the previous frame.

24. The encoder of claim 16, wherein the scene change detector converts picture type of a frame from P type to I type, and performs intra coding on the frame.

25. The encoder of claim 16, wherein the GOP selector groups frames into GOP having frames of similar complexity according to the quantization factor, and outputs the result to the rate distortion function updating unit.

26. The encoder of claim 25, wherein the rate distortion function updating unit updates parameters X1 and X2 to be used in updating the rate distortion function according to the quantization factor determined by the quantization factor decision unit, and the variable-length coding result performed by the variable-length coding unit, when the GOP is formed by the GOP selector.

27. The encoder of claim 26, wherein the quantization factor decision unit determines the quantization factor according to the complexity calculated by the complexity calculator, the target bit rate determined by the target bit rate decision rate, and the parameters X1 and X2 updated by the rate distortion function updating unit.

28. The encoder of claim 16, wherein the quantization factor decision unit sets the upper and lower values of the quantization factor, and control the quantization factor to change within the upper and lower values.

29. The encoder of claim 16, wherein the quantization factor decision unit calculates the quantization factor by the following:

$Q(t)=(1\pm K)\times Q(t-1)$, where $K=L\times D$ $D=r/(1+L)$, where $1\leq r<1+L$ $D=(1-L)/r$, where $1-L<r<1$ $D=1$, otherwise wherein L denotes a limited parameter, D denotes a deviation parameter, r denotes a parameter that represents a deviation of the amount of the present bit with respect to the amount of the target bit, Q(t) denotes the present quantization rate, and Q(t−1) denotes the previous quantization rate.

30. The encoder of claim 16, wherein the encoding unit further comprises a frame rate controller for decreasing a frame rate for the prevention of deterioration of the quality of an image, when a lot of bit are produced due to a sudden increase in the motion of a frame and an increase in the activity of the frame.

31. An encoding method comprising:
   (a) encoding a video object with an initial quantization factor;
   (b) grouping frames into GOP having frames of similar complexity, using the quantization factor;
   (c) updating parameters of a rate distortion function in accordance with the GOP;
   (d) determining if a scene change is detected;
   (e) converting the picture type from P type to I type and grouping frames into GOP, returning to step (b), when it is determined in step (d) that a scene change is detected;
   (f) allocating overall bit estimate to each frame and determining a target bit rate of a frame when it is determined in step (d) that a scene change is not detected;
   (g) calculating a new quantization factor and a variation in the quantization factor with the complexity and the target bit rate; and
   (h) encoding the video object with the quantization factor calculated in step (g).

32. The encoding method of claim 31, wherein in step (d), a scene is considered as changing when the complexity is predetermined times as large as an average of the complexity of the frames or the previous complexity.

33. The encoding method of claim 31, wherein in step (d), the picture type of a frame is converted from P type to I type and intra coding is performed thereon.

34. The encoding method of claim 31, wherein in step (g), the upper and lower values of the quantization factor are set so that the quantization factor can change within the upper and lower values.

35. The encoding method of claim 34, wherein in step (g) the quantization is calculated by the following:

$Q(t)=(1\pm K)\times Q(t-1)$, where $K=L*D$ $D=r/(1+L)$, where $1\leq r<1+L$ $D=(1-L)/r$, where $1-L<r<1$ $D=1$, otherwise wherein L denotes a limited parameter, D denotes a deviation parameter, r denotes a parameter that represents a deviation of the amount of the present bit with respect to the amount of the target bit, Q(t) denotes the present quantization rate, and Q(t−1) denotes the previous quantization rate.

36. The encoding method of claim 31, wherein in step (f), an initial bit estimate is set as a bit estimate required for m×n time (m and n are integers), and allocating a bit estimate required for n time as the overall bit estimate whenever n time passes.

37. The encoding method of claim 31, wherein in step (f), each frame is allocated with the bit estimate calculated by the following:

$R=(Rr/Nr)\times m+$(the amount of bit in the previous frame)$\times n$, $(m+n=1)$ wherein R denotes the amount of bit to be allocated to each frame, Rr denotes the amount of available bit, Nr denotes the number of frames to be encoded.

38. The encoding method of claim 31, wherein the complexity can be expressed as a mean absolute difference (MAD) parameter or a motion vector (MV) parameter,
   wherein the MV parameter comprises an average of absolute values of the amount of motion between frames, and a mean absolute difference between motion vectors.

39. The encoding method of claim 38, wherein the mean absolute value of the amount of motion between frames is calculated by the following:

$$|MV| = \frac{1}{N}\sum_{i=1}^{N}(|MVxi|+|MVyi|)$$

wherein N denotes the number of macro blocks, MVxi denotes a horizontal substance of a motion vector, MVyi denotes a vertical substance of the motion vector.

40. The encoding method of claim 38, wherein the average of the absolute values of differences between motion vectors is calculated by the following:

$$M\_dif = \left[\frac{1}{V(H-1)}\sum_{j=1}^{V}\sum_{i=1}^{H-1}(|MVxj,i+1-MVxj,i|+|MVyj,i+1-MVyj,i|)+\right.$$

-continued $$\frac{1}{H}(V-1)\sum_{i=1}^{H}\sum_{j=1}^{V-1}(|MVxj+1,i-MVxj,i|+|MVyj+1,i-MVyj,i|)$$

M_dif denotes an MAD, H indicates the number of horizontal macro blocks, and V indicates the number of vertical macro blocks. MVxj, i denotes an x-substance of the MV with respect to the present macro block, MVyj, i denotes an y-substance of the MV with respect to the present macro block, MVxj, i+1 denotes an x-substance of the MV with respect to the next horizontal macro block, MVyj, i+1 denotes an y-substance of the MV with respect to the next horizontal macro block, MVxj+1, i denotes an x-substance of MV with respect to the next vertical macro block, and MVyj+1, i denotes an y-substance of MV with respect to the next vertical macro block.

41. The encoding method of claim 31, wherein the encoding unit further comprises a frame rate controller for decreasing a frame rate for the prevention of deterioration of the quality of an image when a lot of bits are produced due to a sudden increase in the motion of a frame and an increase in the activity of the frame.

42. A program storage device readable by machine, tangibly embodying a program of instructions executable by the machine to perform method steps for executing an encoding method, the method steps comprising:
encoding a video object with an initial quantization factor;
grouping frames into GOP having frames of similar complexity, using the quantization factor;
updating parameters of a rate distortion function in accordance with the GOP;
determining if a scene change is detected;
converting the picture type from P type to I type and grouping frames into GOP, returning to the step of grouping when it is determined in the step of determining that a scene change is detected;
allocating an overall bit estimate to each frame and determining a target bit rate of a frame when it is determined in the step of determining that a scene change is not detected;
calculating a new quantization factor and a variation in the quantization factor with the complexity and the target bit rate; and
encoding the video object with the quantization factor calculated in the step of calculating.

43. A program storage device as defined in claim 42 wherein the step of determining if a scene change is detected comprises considering a scene as changing when the complexity is a predetermined multiple of at least one of an average of the complexity of the frames and the complexity of the previous frame.

44. A program storage device as defined in claim 42 wherein the step of determining if a scene change is detected comprises converting the picture type of a frame from P type to I type and performing intra coding thereon.

45. A program storage device as defined in claim 42 wherein the step of calculating a new quantization factor and a variation in the quantization factor with the complexity and the target bit rate comprises setting the upper and lower values of the quantization factor so that the quantization factor can change within the upper and lower values.

46. A program storage device as defined in claim 45 wherein the step of calculating a new quantization factor and a variation in the quantization factor with the complexity and the target bit rate further comprises calculating the quantization by the following:

$$Q(t)=(1\pm K)\times Q(t-1), \text{ where } K=L*D$$

$$D=r(1+L), \text{where } 1\leq r<1+L$$

$$D=(1-L)/r, \text{ where } 1-L<r<1$$

$$D=1, \text{ otherwise}$$

wherein L denotes a limited parameter, D denotes a deviation parameter, r denotes a parameter that represents a deviation of the amount of the present bit with respect to the amount of the target bit, Q(t) denotes the present quantization rate, and Q(t-1) denotes the previous quantization rate.

47. A program storage device as defined in claim 42 wherein the step of allocating an overall bit estimate to each frame and determining a target bit rate of a frame when it is determined in the step of determining that a scene change is not detected comprises setting an initial bit estimate as a bit estimate required for m×n time (m and n are integers), and allocating a bit estimate required for n time as the overall bit estimate whenever n time passes.

48. A program storage device as defined in claim 42 wherein the step of allocating an overall bit estimate to each frame and determining a target bit rate of a frame when it is determined in the step of determining that a scene change is not detected comprises allocating each frame with the bit estimate calculated by the following:

$$R=(Rr/Nr)\times m+(\text{the amount of bit in the previous frame})\times n, (m+n=1)$$

wherein R denotes the amount of bit to be allocated to each frame, Rr denotes the amount of available bit, Nr denotes the number of frames to be encoded.

49. A program storage device as defined in claim 42 wherein the complexity can be expressed as at least one of a mean absolute difference ("MAD") parameter and a motion vector ("MV") parameter, wherein the MV parameter comprises an average of absolute values of the amount of motion between frames and the MAD parameter comprises a mean absolute difference between motion vectors.

50. A program storage device as defined in claim 49 wherein the mean absolute value of the motion vector corresponding to the amount of motion between frames is calculated by the following:

$$|MV|=\frac{1}{N}\sum_{i=1}^{N}(|MVxi|+|MVyi|)$$

wherein N denotes the number of macro blocks, MVxi denotes a horizontal substance of a motion vector, MVyi denotes a vertical substance of the motion vector.

51. A program storage device as defined in claim 49 wherein the average of the absolute values of differences between motion vectors corresponding to the mean absolute difference is calculated by the following:

$$M\_dif = \left[ \frac{1}{V}(H-1) \sum_{j=1}^{V} \sum_{i=1}^{H-1} (|MVxj, i+1 - MVxj, i| + |MVyi, i+1 - MVyj, i|) + \frac{1}{H}(V-1) \sum_{i=1}^{H} \sum_{j=1}^{V-1} (|MVxj+1, i - MVxj, i| + |MVyj+1, i - MVyj, i|) \right]$$

wherein M_dif denotes an MAD, H indicates the number of horizontal macro blocks, and V indicates the number of vertical macro blocks, MVxj, i denotes an x-substance of the MV with respect to the present macro block, MVyj, i denotes an y-substance of the MV with respect to the present macro block, MVxj, i+1 denotes an x-substance of the MV with respect to the next horizontal macro block, MVyj, i+1 denotes an y-substance of the MV with respect to the next horizontal macro block, MVxj+1, i denotes an x-substance of MV with respect to the next vertical macro block, and MVyj+1, i denotes an y-substance of MV with respect to the next vertical macro block.

52. A program storage device as defined in claim 42, the method steps further comprising decreasing a frame rate when an increased number of bits are produced for preventing deterioration of the quality of an image due to at least one of a sudden increase in the motion of a frame and an increase in the activity of the frame.

53. A real-time variable bit rate encoder comprising:
converter means for performing a predetermined image conversion on video data;
quantizer means responsive to the converter means for quantizing the converted video data:
encoder means responsive to the quantizer means for encoding the quantized converted video data into a variable bit rate stream;
estimator means for allocating an overall bit estimate of the video data to be stored in a system to each frame according to a variation in video recording time;
detector means for detecting the complexity of video data frames based on a difference between pixels of the encoded video data; and
controller means for determining a quantization factor using the detected complexity,
wherein the controller means comprises:
calculator means for allocating the overall bit estimate to each frame according to a variation in video recording time, and detecting the complexity of frames with a difference between pixels of the previous video data and the present video data;
targeting means for determining a target bit rate to be stored in each frame in accordance with the calculator means;
difference means for detecting a scene change in the present video data in accordance with the targeting means;
selector means for grouping frames of the present video data into groups of pictures having frames of similar complexity in accordance with the difference means;
update means for updating a rate distortion function for use in calculating a quantization factor in accordance with the selector means; and
decision means for calculating the quantization factor in accordance with the update means.

* * * * *